Oct. 29, 1935.　　　　　O. V. KEAN　　　　　2,018,891

PHOTOGRAPHIC DEVICE AND METHOD

Original Filed Jan. 24, 1933　　3 Sheets—Sheet 1

INVENTOR
Otho V. Kean
BY Warfield & Brown
ATTORNEYS

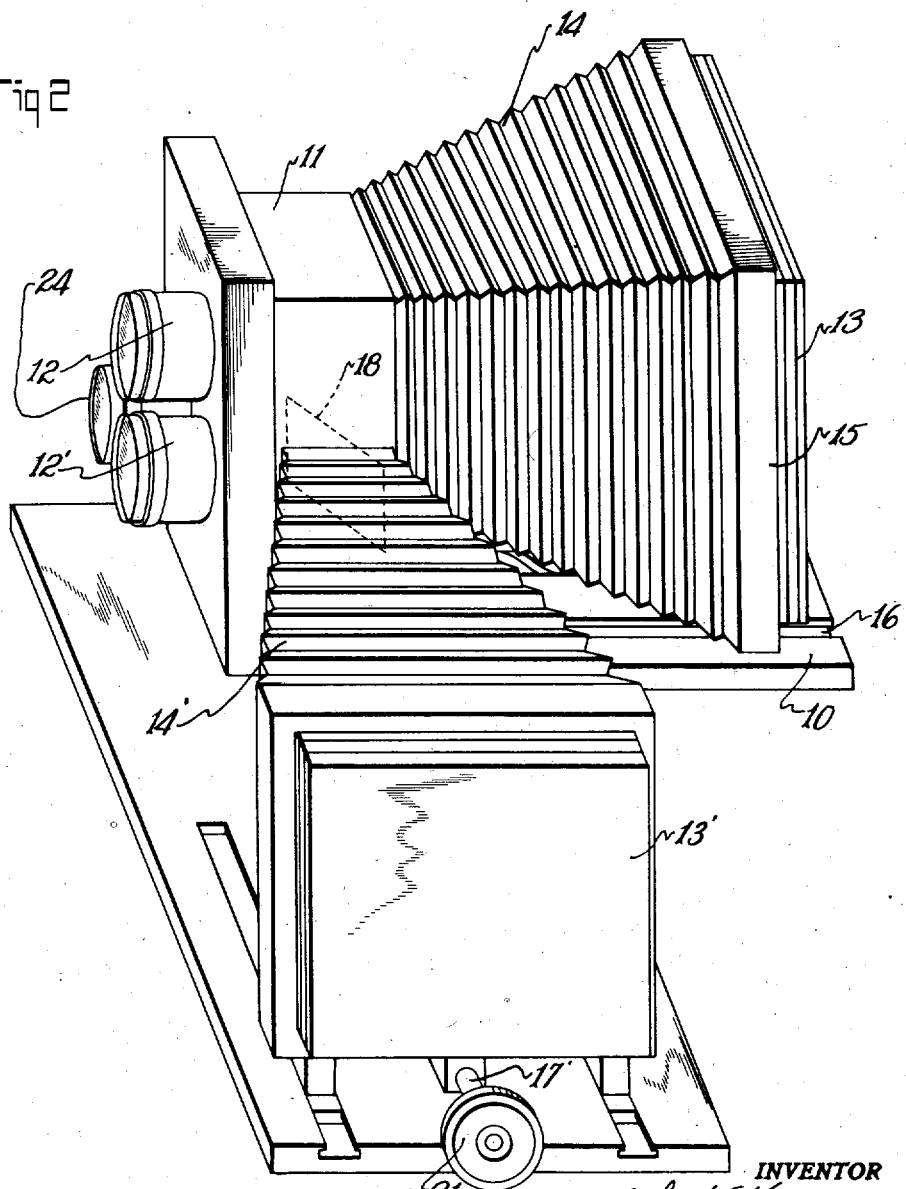

Oct. 29, 1935. O. V. KEAN 2,018,891
PHOTOGRAPHIC DEVICE AND METHOD
Original Filed Jan. 24, 1933   3 Sheets-Sheet 3
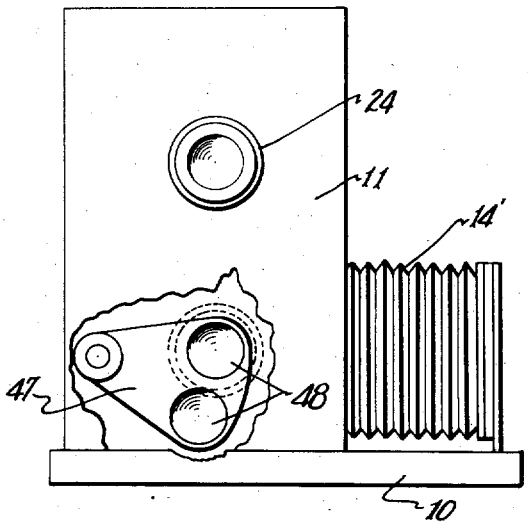
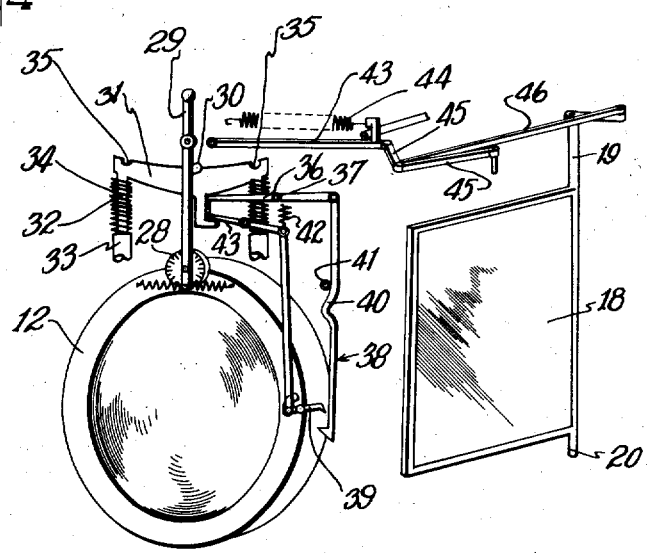
INVENTOR
Otho V. Kean
BY Warfield & Brown
ATTORNEYS Patented Oct. 29, 1935

2,018,891

UNITED STATES PATENT OFFICE 2,018,891

PHOTOGRAPHIC DEVICE AND METHOD

Otho V. Kean, Bronxville, N. Y., assignor to Frederic P. Warfield, New York, N. Y.

Application January 24, 1933, Serial No. 653,245
Renewed March 27, 1935

26 Claims. (Cl. 95—18)

This invention relates to photographic devices and methods, and more especially to devices which take both positives and negatives.

In general, it is an object of the invention to provide a device of the character described, which will efficiently perform the purpose for which it is intended, which is simple and economical of construction, which can be expeditiously and conveniently manipulated, and which can be readily manufactured and assembled.

Another object of the invention is to provide a rapid method of obtaining satisfactory photographic images wherein a negative and a rectified positive of the same or substantially the same image are obtained simultaneously or substantially simultaneously, and apparatus for use in connection therewith.

Another object is to provide a camera with two bellows with a single lens system or with two lens systems which are but slightly spaced from each other.

Another object is to provide a camera which gives a negative and a rectified positive, wherein each is taken from the same vertical plane; wherein a difference in the emulsion speeds of the negative and the positive is allowed for either through exposure control or by variation of the optical elements; wherein there is unitary focusing; and wherein the exposure period mechanism and the mechanism for directing the light paths operates automatically in the proper sequence.

Another object is to provide a rapid method of securing a selected enlarged photographic image wherein a relatively small positive with slight shading is used as a sample of the final enlargement which will have more nearly perfect shading.

Other objects of the invention will in part be obvious and will in part appear hereinafter.

The invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention, reference should be had to the following detailed description taken in connection with the accompanying drawings, in which:

Fig. 2 is a modification of the device shown in Fig. 1;

Fig. 3 is a view in elevation of the front of the device shown in Fig. 1, a portion being broken away and showing a modifying detail; and Fig. 4 is a diagrammatic representation of one form of a mechanical detail adapted to be used in the device shown in Fig. 1.

Figure 1:
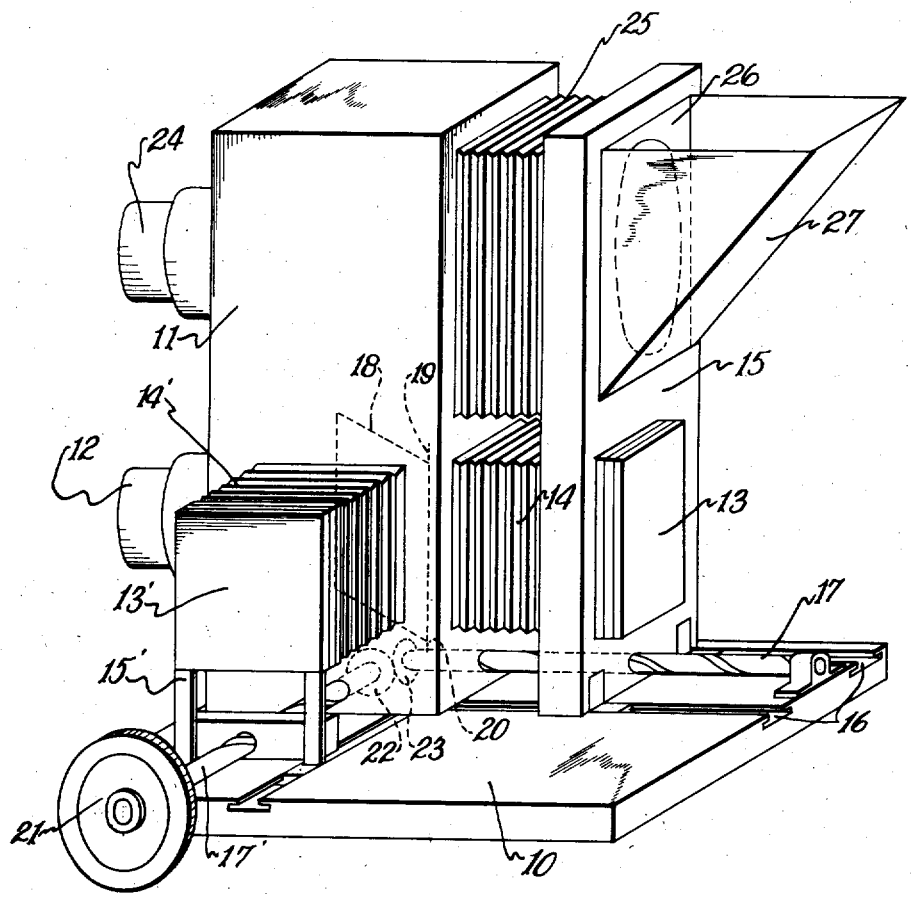
Fig. 1 is a perspective view of one form of device embodying the invention.

In the art of photography it is advantageous to have a sample or proof immediately available after the picture is taken so that if it is unsatisfactory another picture may be taken. A positive may be taken at the same time as the negative. The usual positive, however, shows an image of objects but in reversed order from left to right. This may almost nullify the value of the positive. For example, a part in the sitter's hair if shown on wrong side, may give the positive such an unnatural appearance that it is impossible to judge the artistry of the picture. The present device gives a rectified image, the left side of which corresponds to the left side of the object as seen from the camera.

Positives and negatives in general require different exposure periods. The present device has means in the camera for stopping down the light when the fast sensitized element which is to become a negative is exposed. Means are also shown whereby a fast lens and a slow one are presented to the aperture of the camera, respectively, when the slow sensitized element which is to become a positive and the fast sensitized element which is to become a negative are exposed. Similar results may be obtained by slow and fast shutters. In each case means are provided for successively exposing the plates and for synchronously operating the proper rectifying means and the length of exposure, or optical "speed" control, means.

Although pictures of objects, particularly animate objects appear differently when taken from points even slightly spaced in the horizontal direction, it is discovered that the difference between pictures taken from points spaced in a vertical direction is less easily discernible. When it is desired to take into account the varying exposure necessary for positives and negatives by using lens systems of different speed, it is possible with the present invention to use two close vertically aligned apertures. Normally the bellows leading between the respective apertures and plates would interfere and would require a large space between the apertures. The present provision of mirror means and one bellows leading away from the other at an angle prevents such interference and allows the space between the apertures to be so slight as not to effect a noticeable difference between the images developed from the two plates.

In the exemplification of the invention shown in the drawings, 10 denotes a supporting frame of the entire camera structure upon which is a fixed enclosure 11. Associated with the front of the enclosure is a main lens system composed of one or more lenses and held in a mounting 12. A plate holder 13 for the sensitized element which is to become a negative is on the axis of the lens and is protected on the side toward the lens in any desired way such as the bellows 14, or other telescoping means. The plate holder and bellows are movable along the lens axis. This may be accomplished in any suitable manner. They may be fixed in frame 15 which is itself moved along the tracks 16 by the screw 17. Between the lens and the holder are means for directing away from the holder 13 at least a portion of the light coming from the lens. These may take the form of a mirror 18 adapted to be swung at times out of the path of the light, the mirror frame 19 being pivoted at 20. A prism or other light bending means may be used. Extending in the path of the deflected light is a bellows 14' leading to a plate holder 13' for the sensitized element which is to become a positive, supported as desired, e. g., by the frame 15'. The end of the bellows 14', the plate holder 13' and the frame 15' may all be movable—as by the screw 17'. The two plate holders may be moved simultaneously by any mechanism such as the disk 21 and the bevel gears 22 and 23.

Any suitable focusing means may be employed. As shown a sighting lens 24 is above the main lens and has an axis parallel therewith. A sighting bellows 25 and ground glass 26 are respectively above and movable with the bellows 14 and the plate holder 13 for the sensitized element which is to become a negative. There may be the usual mirror 27 behind the ground glass.

In place of the movable light deflecting means there may be a semi-reflecting, semi-transparent means such as a partially silvered mirror. Roll film or cut film may be used instead of plates.

Various arrangements are possible for exposing the sensitized element which is to become a positive for a given time, bringing the light deflecting means into operative position and exposing the negative for a given time. Either may be exposed first. The shutter means may be adjacent either sensitized element or associated with the lens system. In Fig. 4 is shown a mechanical means of operating one shutter at the lens while the mirror is in one position, then changing the mirror and operating the shutter again. A conventional shutter timing device is attached to the lens mounting 12. The time control spring within this device is set at any desired exposure period by turning the dial. Thereafter the device is cocked by the initial change in position of the manually operable lever 29. The roller 30 projects from said lever and rides on cam 31 which is integral with the elements 32 which move in the fixed sleeves 33. When the lever 29 is pushed to one side it forces the cam down against the action of resilient means 34 and is caught in one of the recesses 35 in the cam surface until automatically released as hereafter explained. The moving cam pivots lever 36 around the fixed pivot 37 and the other end of the lever 36 in turn raises the hanging rod 38. A hook on the end of rod 38 raises the pivoted arm 39 which cocks the shutter and makes the exposure. As the rod continues to move upward a projection 40 thereon rides against a fixed point 41 which pushes the rod away from the arm 39. The other end of said arm 39 is thereby freed to be moved by a spring 42 to operate the pivoted lever 43 which is in contact with the cam 31 and moves it away from the roller 30 permitting the main lever 29 to return to neutral position. A spring within the timing device may, independently of or in conjunction with spring 42, cause the arm 39 to drop down after exposure.

As the lever 29 is pushed to the right it moves the light deflecting means through a train of elements into its operating position before the complete movement to the right operates the shutter mechanism. This train may comprise a rod 43 which slides in a sleeve (unshown) against the action of a resilient means 44 when pushed by lever 29 and which operates the links 45 of a toggle. An arm 46 connects the joint between the links to the frame 19 and rotates it on its pivot.

The motion of the lever 29 to the right thus swings the mirror 18 into reflecting position, cocks the arm 39 and makes the exposure after which said arm immediately drops forcing the lever 29 back to neutral position and the resilient means 44 swings the mirror so as to remove it from the light path. The lever 29 may next be thrown to the left cocking the time control spring of the shutter for the corresponding time set on the other side of the dial 28 after which the shutter operates, and the lever 29 returns again to neutral. The lever 29 may be operated manually or suitable mechanism may cause both the motion to the left and thereafter to the right of the lever 29.

There may be means for stopping down the light passing through the lens system and this may be arranged to operate only during the exposure of one of the light sensitive elements.

There may be automatic means provided for immediately developing and delivering the sample proof.

If it be desired to use the one lens for three different sensitized emulsions, another camera may be offset and a second mirror may be supplied and arranged to swing into the path of rays and divert them to the extra camera.

In this case the center position of lever 29 would hold the dial at the timing for the sensitized element in rear of the lens and the right and left positions of the lever would correspond to the 45° positions of the two mirrors. The exposure would be made by hand actuation of the exposure lever when the lever remains at the central position and the exposure for the other two would be made by the movement of the lever, other features of the mechanism being adjusted accordingly.

Another arrangement might be to use a right and left offset camera, one on each side and to place a ground glass for focusing directly in rear of the lens, the focusing ground glass taking the place of the rear sensitized emulsion. In this case the shutter is held open while focusing and then, by swinging the lever 29 to right and left the two exposures (with lens accurately focused) are made. If so desired, a second lens may be used for focusing, this lens being either parallel to the camera lens, or the two lenses converging on the same part of the subject.

In the modification shown in Fig. 2, the image, which reaches the plate holder 13' after being recified by the mirror or other rectifying means 16, s introduced to the camera through a second ens system 12' closely adjacent vertically to the ens system 12 which transmits light to the plate holder 13. The fact that the pyramidal bellows 4' extends at an angle to the pyramidal bellows 4 permits the two lens systems 12 and 12' to be very close. As a result the rectified positive may be used as a quick proof, the discrepancy between it and the finished negative not being noticeable particularly as they are taken in the same vertical plane. There may be a further sighting lens 14 with appropriate sighting elements.

If desired the lens for the plate which is to become a positive may be above the other lens and the mirror be movable. The light coming through the lens which is used with the sensitized element which is to become the negative, may be led by reflecting means to a considerably lower level so that the bellows which is to be used with the sensitized element which is to become the negative, will not interfere with a direct sighting and focusing through the lens which is to be used with the sensitized element which is to become the positive, the mirror being swung aside. Such an arrangement permits the lenses to be placed practically side by side.

In certain instances it may be desired to use the image as taken through the same aperture in the camera. The difference in the sensitivity of the light recording elements in the plate holders may make a difference in the lens system preferable for the two recording elements. In such a case, means may be provided to change the lens system before exposure on the second element. For example, in Fig. 3 a turret 47 may be mounted behind a stationary front lens or glass plate and may have a plurality of lenses 48 therein. Suitable means may place one of the lenses 48 in the path of the light when the corresponding sensitive element is to be exposed.

In the case where a positive print is quickly made as a proof of what the enlargement will be, it is essential on small positive prints that the print be not too "contrasty", in other words, that the shadows be not too heavy as compared with the high lights. Therefore, in order to have best results for both the small positive print and the enlargement, it is of advantage to make two exposures of the same pose, the first exposure with normal lighting for a small positive print, that is, with only light shadow on shaded portion, and the second exposure being with one of the lights dimmed more than the other, or more shadow on the shaded side of the face than appeared in the first exposure where the shadow was light. This second and more "contrasty" lighting may apply to the second exposure whether in making a second positive print (from which an enlargement will be made,) or, making a paper negative or a negative on film, glass or other material inserted in the camera.

If the enlargement is made from a positive, it is customary to photograph the positive, making a transparent negative and for best results the negative may be retouched. An enlarged positive is then printed from the negative so made, in an ordinary projection printing machine. When the enlargement is made, however the shadows tend to thin out in enlargement and a print which has very light shadow to start with, in small size, loses its much needed shadow in enlargement. If, however, the second exposure gives more deeply shaded lighting, although the positive print or small negative made from the second printing may show considerable shadow, this shadow thins out during enlargement and makes a much more attractive print than would be possible from enlarging the small positive or negative with the light shadow which is most satisfactory for the small positive print.

The heavier shadow for the second exposure may be made in several ways. It is preferred not to change the direction of the lights, but to put a translucent screen across the light to be dimmed, for example, tracing cloth. However, the actual illumination candle power may be reduced, or the direction of the light may be changed so that it does not fall as squarely on the subject, or the shadow may be increased automatically in any desired fashion. Thus one light may be removed farther from the subject which will reduce the intensity of the light thus pulled back.

It is found that a paper negative develops quicker than a paper positive. It is possible to take one picture on a usual film negative and to take another simultaneously through a closely adjacent aperture on a paper which is to become a negative, to make a print of the latter (after the negative is developed) by reflection and to develop this print as a proof. There is no need for rectifying the path of light during exposure in this case.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent, is:

1. In a device of the character described, the combination comprising means adapted for exposing a sensitized element to a given light pattern, means adapted for exposing independently of said element a second sensitized element to the same light pattern rectified, and means adapted for operating successively said beforementioned means.

2. In a device of the character described, the combination comprising means adapted for exposing a sensitized element to a given light pattern, means adapted for exposing a second sensitized element to the same light pattern rectified, and means adapted for giving said elements periods of exposure respectively suitable for said elements.

3. In a device of the character described, the combination comprising means adapted for exposing a sensitized element to a given light pattern, means adapted for exposing a second sensitized element to the same pattern rectified, and means adapted for simultaneously focusing for each of said elements.

4. In a device of the character described, the combination comprising a single lens system, a holder for a sensitized element, a second holder for holding a second sensitized element at an angle with said first element, movable means adapted for deviating light coming from said system from one of said light-sensitive elements to the other and for rectifying the image formed by said system, and means adapted for giving a proper exposure to a sensitized element in said first holder and a proper exposure to a second sensitized element in said second holder.

5. In a device of the character described, the combination comprising a single lens system, a holder for a sensitized element, a second holder for holding a second sensitized element at an angle with said first element, movable means adapted for deviating light coming from said system from one of said light-sensitive elements to the other and for rectifying the image formed by said system, means adapted for giving a proper exposure to a sensitized element in said first holder and a proper exposure to a second sensitized element in said second holder, and means adapted for motivating said movable means and said exposure means in predetermined sequence.

6. In a device of the character described, the combination comprising a single lens system, a holder for a sensitized element, a second holder for holding a second sensitized element at an angle with said first element, movable means adapted for deviating light coming from said system from one of said light-sensitive elements to the other and for rectifying the image formed by said system, means for passing the light beyond said system for predetermined intervals, and means for shutting down the light reaching one of said elements.

7. In a device of the character described, the combination comprising a lens system, a second lens system having an optical axis substantially in the vertical plane of the axis of said first system, and means adapted for deviating and rectifying an image transmitted by the other of said systems.

8. In a device of the character described the combination comprising means having an aperture, a fixed lens system associated therewith, a holder for a light sensitive element in line with said system, means adapted for presenting at certain times optical elements adapted for modifying light passing through said system, movable means adapted for rectifying the image carried by said modified or said unmodified light and for changing the direction of the path thereof and a holder for another sensitive element in said changed path.

9. In a device of the character described the combination comprising means having an aperture, a fixed lens system associated therewith, a holder for a light sensitive element in line with said system, a turret adapted for presenting at certain times optical elements adapted for modifying light passing through said system, mirror means adapted for rectifying the image carried by said modified or said unmodified light and for changing the direction of the path thereof and a holder for another sensitive element in said changed path.

10. In a device of the character described the combination comprising means having an aperture, a fixed lens system associated therewith, a holder for a light sensitive element in line with said system, means adapted for presenting at certain times optical elements adapted for modifying light passing through said system, movable means adapted for rectifying the image carried by said modified or said unmodified light and for changing the direction of the path thereof, a holder for another sensitive element in said changed path, and means adapted for operating said presenting means and said movable means in a predetermined order.

11. In a device of the character described the combination comprising means having an aperture, means adapted for presenting successively to said aperture lens systems having differing optical properties, a holder for a light sensitive element in the path of light passing through said aperture and one of said systems, movable means adapted for changing the direction of said path and for rectifying the image formed by said one system and a holder for another sensitive element in said changed path.

12. In a device of the character described the combination comprising means having an aperture, means adapted for presenting successively to said aperture lens systems having differing photographic speed properties, a holder for a light sensitive element in the path of light passing through said aperture and one of said systems, movable means adapted for changing the direction of said path and for rectifying the image formed by said one system and a holder for another sensitive element in said changed path.

13. The method of recording a view of an animate object upon a plurality of elements of varying light sensitivity, which comprises making said recordings at such a rate that the appearance of the object is substantially unchanged, and compensating for said variation in sensitivity by varying the intensity of illumination upon said object.

14. The method of recording a view of an animate object upon a plurality of elements of varying light sensitivity, which comprises making said recordings at such a rate that the appearance of the object is substantially unchanged, and compensating for said variation in sensitivity by varying the intensity of the light reaching said elements.

15. The method of recording a view of an animate object upon a plurality of elements of varying light sensitivity, which comprises making said recordings at such a rate that the appearance of the object is substantially unchanged, and compensating for said variation in sensitivity by varying the photographic "speed" of the optical system employed.

16. A method of obtaining a selected photographic image, comprising passing light from an object through a single lens system, causing the image, in relatively rapid succession, to fall directly on a sensitized film adapted to become a negative and to fall rectified on a sensitized paper adapted to become a negative, and printing a sample from the rectified negative formed on said paper.

17. A method of obtaining a selected photographic image, comprising passing light from an object through a single lens system, causing the image, in relatively rapid succession to fall directly on the sensitized film adapted to become a negative, and to fall rectified on a transparent sensitized paper adapted to become a negative, and printing a sample by light transmitted through the negative formed from said transparent paper.

18. A method of obtaining a selected photographic image, comprising passing light from an object through two relatively close, vertically-aligned lens systems, exposing a sensitized paper adapted to become a negative behind one of said systems, and a sensitized film adapted to become a negative behind the other of said sysems, and printing a sample from the negative formed on said paper.

19. In a process of the character described the steps comprising recording a view of an object as an image upon a relatively slow, light sensitive element, while said object is so illuminated that said image will have proper shading, recording substantially the same view as an image on another light sensitive element while said object is so illuminated that said image after enlargement will have proper shading, and making the time interval between said recordings such that the appearance of said object aside from the effect of illumination is substantially unchanged.

20. In a device of the character described the combination comprising means adapted for exposing a light sensitive element to a given animate object through a given aperture, means adapted for exposing another light sensitive element to said object through said aperture, means adapted for changing the illumination on said object and means adapted for operating said three first mentioned means in a predetermined order at such a rate that the appearance of said object shall, aside from illumination, remain unchanged.

21. In a device of the character described, the combination comprising means adapted for exposing a sensitized element to a given light pattern and means adapted for simultaneously exposing a second sensitized element to the same light pattern rectified.

22. In a device of the character described, the combination comprising means adapted for exposing a sensitized element to a given light pattern and partially transparent means adapted for simultaneously exposing a second sensitized element to the same light pattern rectified.

23. In a device of the character described, the combination comprising means adapted for exposing a sensitized element to a given light pattern and partially reflecting means adapted for simultaneously exposing a second sensitized element to the same light pattern rectified.

24. In a device of the character described, the combination comprising means adapted for exposing a sensitized element to a given light pattern and fixed means adapted for exposing a second sensitized element to the same light pattern rectified.

25. In the process of obtaining an immediate sample of a photograph, the steps comprising exposing a sensitized element to a given light pattern, exposing a second sensitized element to a rectified pattern of the same light and developing said latter element immediately as a sample.

26. In the process of obtaining an immediate sample of a photograph, the steps comprising exposing a sensitized element to a given light pattern, exposing a second sensitized element to a rectified pattern of the same light at a point of time immediately adjacent said first exposing, and developing said latter element immediately as a sample.

OTHO V. KEAN.